Dec. 22, 1970  F. E. LORENZ, JR  3,549,265
CLEANING APPARATUS
Filed Aug. 3, 1968  2 Sheets-Sheet 1
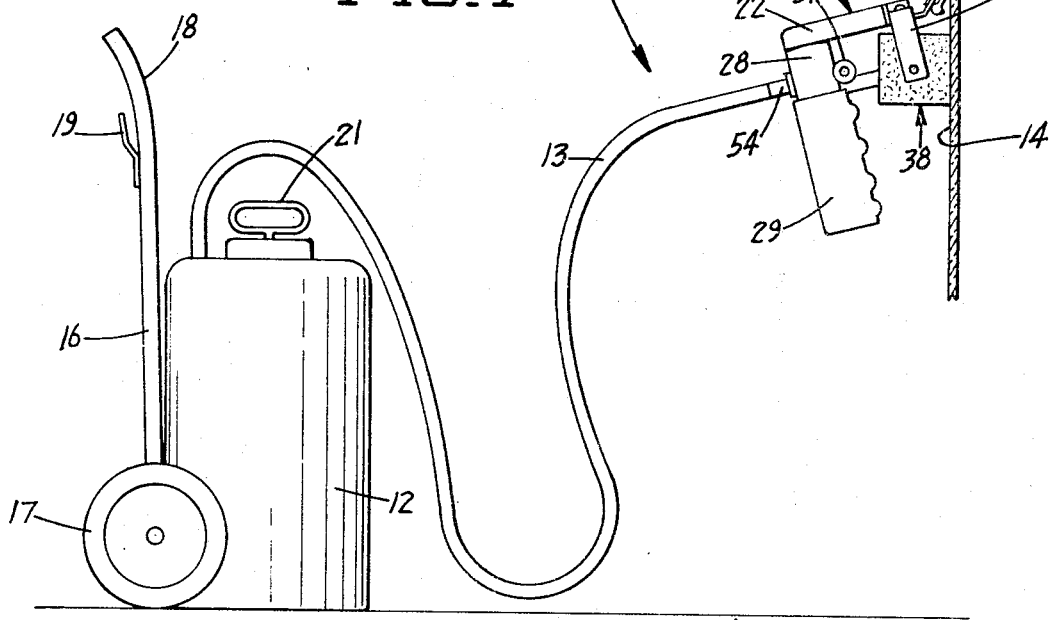
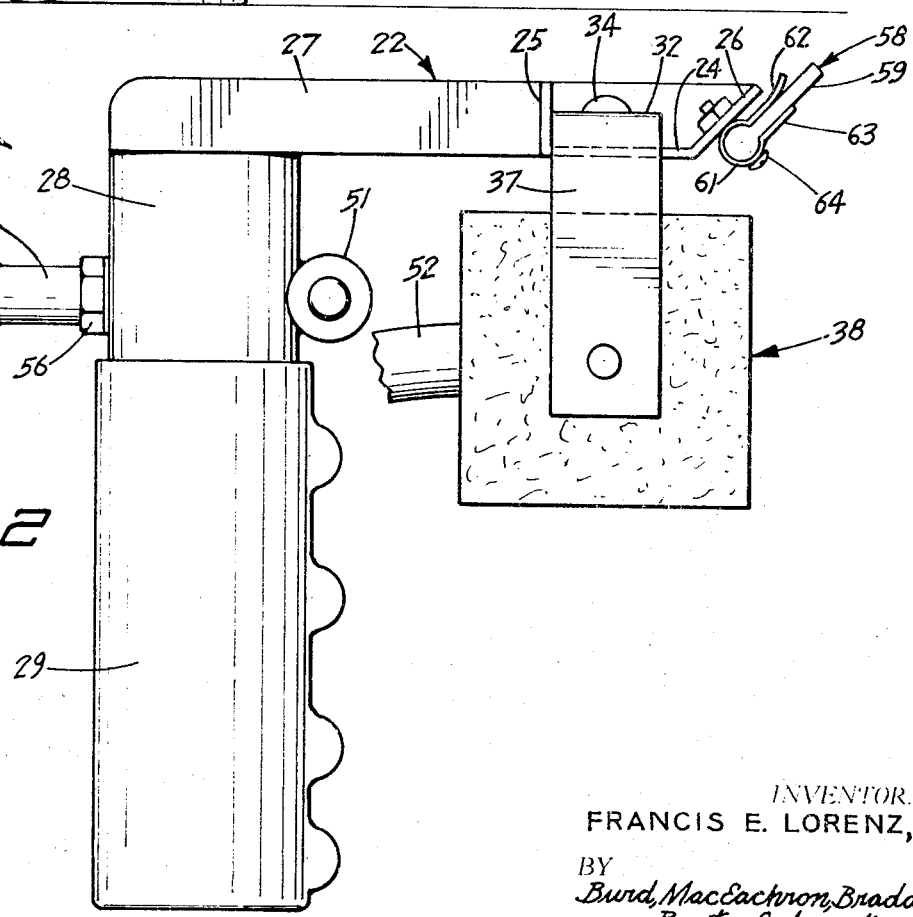
INVENTOR.
FRANCIS E. LORENZ, JR.
BY
Burd, MacEachron, Braddock,
Bartz & Schwartz
ATTORNEYS Dec. 22, 1970   F. E. LORENZ, JR   3,549,265
CLEANING APPARATUS
Filed Aug. 8, 1968   2 Sheets-Sheet 2
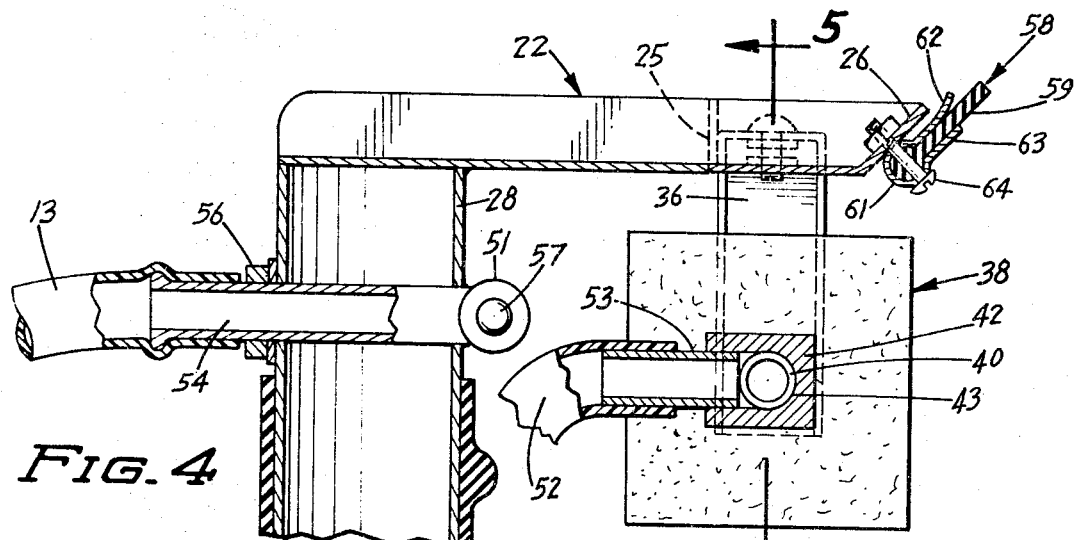
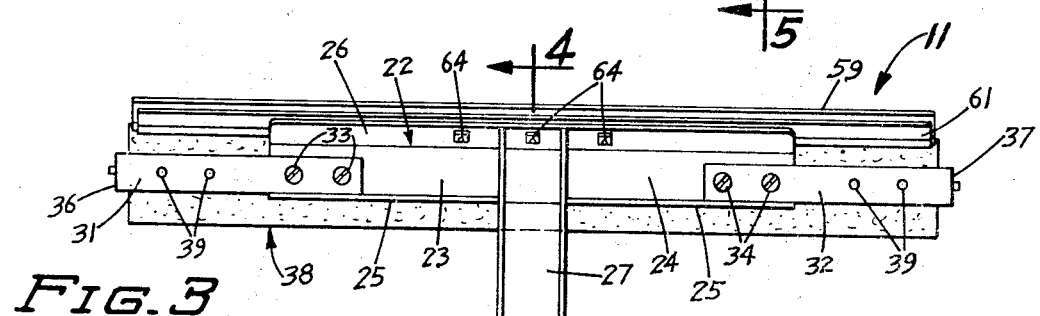
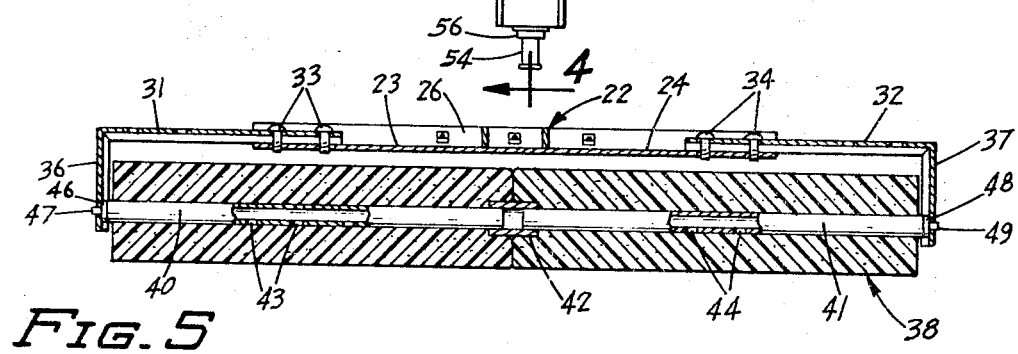
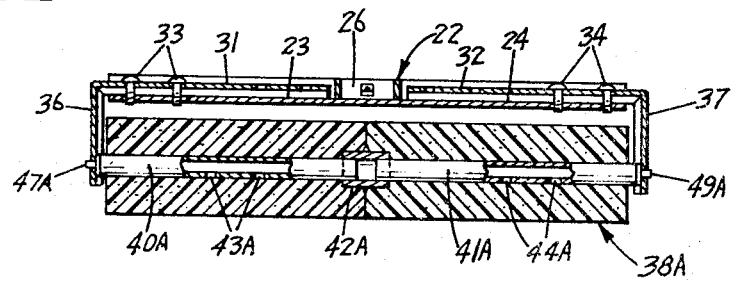
INVENTOR.
FRANCIS E. LORENZ, JR.
BY
Burd, MacEachron, Braddock,
Bartz & Schwartz
ATTORNEYS

United States Patent Office 3,549,265
Patented Dec. 22, 1970

3,549,265
CLEANING APPARATUS
Francis E. Lorenz, Jr., 383 S. Brimhall,
St. Paul, Minn. 55105
Filed Aug. 8, 1968, Ser. No. 751,118
Int. Cl. A47l 1/08
U.S. Cl. 401—25    10 Claims

ABSTRACT OF THE DISCLOSURE

A combined washer and wiper unit having a T-shaped frame attached to a handle. A squeegee blade is secured to the top of the frame. Lateral arms adjustably mounted on the frame support a perforated tube carrying a sponge below the squeegee blade. A valve mounted on the handle is operable to control the flow of a cleaning fluid from a pressure tank to the tube and the sponge.

BACKGROUND OF INVENTION

Mechanical implements, as sponges and squeegees, are used to wash windows. Initially the sponge is used to apply cleaning liquid and remove dirt from the window. In a separate operation a squeegee is used to wipe the window. With this method of washing windows the entire surface of the window must be covered twice, duplicating both time and labor. Window cleaning implements having a brush and squeegee, as shown in U.S. Pat. No. 2,104,161, have been designed to scrub the window with the brush and wipe the window with the squeegee. The combined washer and wiper unit of the invention is operable to concurrently wash a window with a cleaning liquid carried in a sponge member and wipe the window with a squeegee.

SUMMARY OF INVENTION

The invention broadly relates to a hand operated washer and wiper unit for cleaning a surface in one operation. The washer and wiper unit has a handle and arm means secured to a frame. A sponge means operably connected to the arm means functions to wash the surface. The handle is angularly disposed at an angle between about 75° to 105° with respect to the frame so that a washing force and movement can be applied to the sponge means with a minimum of effort. The invention is further characterized with squeegee blade mounted on the frame forwardly of and generally parallel to the sponge means. Cleaning fluid is supplied to the sponge means through a perforated tube extended through the sponge means.

In the drawings:

FIG. 1 is an elevational view of the cleaning apparatus of the invention as used to clean a window;

FIG. 2 is a side view of the combined washer and wiper unit;

FIG. 3 is a top plan view at a reduced scale of the washer and wiper unit of FIG. 2;

FIG. 4 is an enlarged sectional view taken along the line 4—4 of FIG. 3;

FIG. 5 is a reduced sectional view taken along the line 5—5 of FIG. 4; and

FIG. 6 is a view similar to FIG. 3 showing the washer and wiper unit adjusted to accommodate a shorter sponge and squeegee.

Referring to the drawing as shown in FIG. 1, a cleaning apparatus indicated generally at 10 for simultaneously washing and wiping a surface 14, as a window surface. Cleaning apparatus 10 has a hand operated combined washer and wiper unit 11 connected to a pressure tank 12 storing cleaning liquid with a flexible hose 13. The unit 11 is operable to simultaneously apply a cleaning liquid and scrub the surface and wipe the scrubbed surface, whereby the surface is cleaned in a single operation.

The pressure tank 12 is mounted on a truck 16 having a pair of wheels 17 and an upright handle 18. Secured to the back of the upper portion of the handle 18 is an upright hook 19 to accommodate the hose 13 and the washer and wiper unit 11 during transport and storage. The cleaning liquid is stored in the tank 12 under pressure supplied by a hand pump 21 mounted on the cap closing the top opening in the tank.

As shown in FIGS. 2 and 3, the combined washer and wiper unit 11 has a generally T-shaped frame 22 with a transverse head having lateral members or portions 23 and 24 with upright flanges 25 and a single forwardly and upwardly inclined lip 26. Secured to the middle of the members 23 and 24 is a rearwardly directed channel shaped base 27. Attached to the bottom of the rear of base 27 is a downwardly projected handle 28 carrying a hand grip 29 as a rubber or plastic sleeve. The handle 28 is normally disposed downwardly with respect to the frame 22 and is about equal in length to the length of frame base 27. The transverse head has a length about twice as long as the base 27.

Located in alignment with members 23 and 24 are outwardly directed arms 31 and 32 respectively. Pairs of fasteners 33 and 34 secure the arms to the members 23 and 24 with the back sides of the arms adjacent flanges 25. The outer portions of arms 31 and 32 have downwardly projected outer ends 36 and 37 attached to a transverse cleaner member indicated generally at 38. The ends 36 and 37 are aligned with each other in a plane extended substantially parallel to the longitudinal axis of the handle 28 and normally disposed with respect to the frame 22. Each of the arms has additional pairs of holes 39 adjacent the outer ends to receive the fasteners 33 and 34. As shown in FIG. 6, when the fasteners are in holes 39 the arms 31 and 32 are in their contracted positions to receive a short cleaner member 38A. FIGS. 3 and 5 show the arms 31 and 32 in their extended positions to receive a long cleaner member 38.

Referring to FIG. 5, cleaner member 38 has a pair of elongated four-sided members capable of retaining a cleaning liquid and having resilient or yieldable cleaning surfaces. Cleaner member 38 is preferably a sponge of plastic material. Member 38 can be formed of any liquid holding cleaning material. Perforated tubes 40 and 41 extended longitudinally through the cleaner member are joined at their inner ends to a T-coupling 42. The four-sided members are telescoped over the tubes 40 and 41 and engage each other at the coupling 42. The tubes 40 and 41 have a plurality of spaced holes 43 and 44 providing openings for the discharge of cleaning fluid into the cleaner member. The opposite ends of the tubes 40 and 41 are closed with plugs 46 and 48. The plug 46 has an outwardly directed projection 47 extended through a hole in the end 36. Plug 48 has a similar projection 49 extended through a hole in end 37 thereby pivotally mounting the cleaner member 38 on the arms 31 and 32.

As shown in FIGS. 2 and 4, a valve 51 is mounted on the upper portion of handle 28 adjacent the cleaner member 38. A flexible tube 52 connects the outlet of valve 51 to the inlet nipple 53 of the coupling 42. Tube 52 extends around the outside of handle 28 to the outlet of the valve so that the cleaner member 38 is substantially free to pivot on arms 31 and 32. The valve 51 extends through the handle 28 and terminates in an inlet 54. A nut 56 threaded on the inlet 54 holds the valve in assembled relation with the handle 28. The inlet 54 carries the end of the tube 13 whereby the cleaning liquid is supplied to the valve 51 from the pressure tank 12.

Valve 51 has a manually operated valve button 57 which is operable with the thumb of the user to open the valve. The cleaning fluid under pressure in the tank 12 will flow through the line 13 and valve 51 to the tubes 40 and 41 inside the cleaner member 38. The cleaning fluid being under pressure will flow through the roles 43 and 44 to evenly apply cleaning fluid over the length of the cleaner member 38. The amount of cleaning fluid in the cleaner member 38 can be regulated as needed by the operation of valve 51.

Located forwardly and parallel to the cleaning member 38 is a squeegee indicated generally at 58. The squeegee comprises an elongated flexible blade 59 made of rubber, synthetic material or the like. As shown in FIG. 4, the inner end of the blade has an enlarged bead enclosed in an elongated holder 61 having a keyhole shaped slot for receiving the transverse bead of the blade. The holder has an upper convex curved flange 62 which controls the outward flexing of the blade 59 to provide uniform wiping of the surface. The lower flange 63 of the holder is straight. The squeegee 58 is attached to the forward side of the lip 26 with a plurality of nut and bolt assemblies 64 which hold the blade 59 substantially parallel to the lip 26.

As shown in FIG. 1, the squeegee 58 is located in close proximity to the cleaner member 38 so that the operator of the combined washer and wiper unit can simultaneously apply a cleaning fluid, scrub the surface and wipe the surface in a single movement of the washer and wiper unit. The angular relationship between the frame 22 and the handle 28 locates the handle in close proximity to the cleaner member 38 so that the washer and wiper unit is effective in close corners such as the lower portions of the window. Both the cleaner member 38 and squeegee 58 can be removed from the frame 22 and replaced with a shorter cleaner member and squeegee, as shown in FIG. 6, so that the same frame and handle is usable with both the wide cleaner member and squeegee and the shorter cleaner member and squeegee. In FIG. 6, the parts of the shorter cleaner member 38A which correspond to cleaner member 38 are identified with the same reference numerals having the suffix A.

In use, the cleaner member 38 covers a longitudinal strip of the window surface as the cleaner member is pivotallly mounted on the arms 31 and 32. One of the flat sides of the cleaner member 38 is in surface engagement with the window surface to spread the cleaning liquid and scrub the surface. The squeegee blade 59 flexes in an upward direction to provide firm and even contact with the wet window surface. On movement of the washer and wiper unit relative to the window surface the cleaner member 38 washes the surface and the wiper blade 59 wipes the surface. The combined washer and wiper unit 11 has been described with reference to cleaning windows. Other surfaces, as walls, floors and the like can be cleaned with the unit 11.

The invention is defined in the following claims.

The embodiments of the invention in which an exclusive property or privilege is claimed are defined as follows:

1. A cleaning apparatus comprising: a frame having a longitudinal base and a cross member attached to one end of the base and projected outwardly from opposite sides of the base, a handle secured to the other end of the blade, said handle projected generally normal to said frame, arm means secured to the cross member, sponge means connected to the arm means, said sponge means located generally parallel to the cross member and between the handle and the cross member, and squeegee means secured to the cross member forward of and generally parallel to the sponge means, whereby the sponge means and squeegee means are concurrently usable to clean a surface.

2. The apparatus of claim 1 including a perforated tube extended longitudinally through the sponge means and mounted on the arm means, and a valve means mounted on the apparatus and fluidly coupled to the tube whereby the valve means controls the flow of a cleaning fluid to the tube.

3. The apparatus of claim 2 including means to rotatably mount the tube on the arm means whereby the sponge means and tube are free to rotate relative to the frame.

4. The apparatus of claim 1 wherein said arm means comprise a first arm adjustably mounted on one side of the cross member and a second arm adjustably mounted on the other side of the cross member whereby sponge means of varying lengths can be supported by the arm means.

5. The apparatus of claim 1 wherein said arm means comprise a first arm adjustably mounted on one side of the member and a second arm adjustably mounted on the other side of the member, a perforated tube means extended longitudinally through the sponge means and mounted on the outer ends of the first arm and the second arm, a valve means mounted on the handle fluidly coupled to the tube means whereby the valve means controls the flow of a cleaning fluid to the tube means.

6. The apparatus of claim 5 including means to rotatably mount the opposite ends of the tube means on the first arm and second arm whereby the sponge means and tube are free to rotate relative to the frame.

7. The apparatus of claim 5 wherein said first arm and second arm have ends projected in the general direction of the handle, and means mounting the sponge means on said ends.

8. The apparatus of claim 1 wherein the cross member has an upwardly inclined transverse forward lip, and means securing the squeegee means to the lip.

9. The apparatus of claim 1 wherein the arm means comprise a first arm mounted on one side of the cross member and a second arm mounted on the other side of the cross member, said first arm and second arm having end portions projected in the general direction of the handle, and means mounting the sponge means on said end portions.

10. The apparatus of claim 1 including means to direct a supply of cleaning fluid to the sponge means.

References Cited

UNITED STATES PATENTS

| | | | |
|---|---|---|---|
| 1,461,947 | 7/1923 | Sporer | 401—25X |
| 1,535,304 | 4/1925 | Gerdin | 401—188 |
| 1,975,585 | 10/1934 | Koukal I | 401—188 |
| 2,104,161 | 1/1938 | Koukal II | 401—25 |
| 2,526,119 | 10/1950 | Cravis | 401—20X |
| 2,818,593 | 1/1958 | Klinger | 401—25X |
| 2,478,318 | 8/1949 | Raub | 401—204X |
| 2,743,469 | 5/1956 | Ditch | 401—204X |

LAWRENCE CHARLES, Primary Examiner

U.S. Cl. X.R.

401—204